United States Patent [19]

Howell et al.

[11] 4,373,347

[45] Feb. 15, 1983

[54] HYBRID DOUBLE-ABSORPTION COOLING SYSTEM

[75] Inventors: John R. Howell, Austin; C. S. Patrick Peng, Houston, both of Tex.

[73] Assignee: Board of Regents, University of Texas System, Austin, Tex.

[21] Appl. No.: 250,319

[22] Filed: Apr. 2, 1981

[51] Int. Cl.³ .............................................. F25B 15/00
[52] U.S. Cl. ........................................ 62/112; 62/148; 62/235.1; 62/238.6; 62/476
[58] Field of Search ............... 62/112, 148, 235.1, 62/238.3, 476

[56] References Cited

U.S. PATENT DOCUMENTS

| | | | |
|---|---|---|---|
| 638,491 | 12/1899 | Allen | 62/238.3 |
| 3,183,680 | 5/1965 | Billi | 62/112 |
| 3,312,078 | 4/1967 | Aerov et al. | 62/112 |
| 3,817,050 | 6/1974 | Alexander et al. | 62/476 X |
| 3,894,528 | 7/1975 | Stubblefield | 126/271 |
| 4,011,731 | 3/1977 | Meckler | 62/2 |
| 4,028,078 | 6/1977 | Peckham | 62/235.1 |
| 4,070,870 | 1/1978 | Bahel et al. | 62/2 |
| 4,151,721 | 5/1979 | Kumm | 62/2 |
| 4,164,125 | 8/1979 | Griffiths | 62/2 |
| 4,171,620 | 10/1979 | Turner | 62/2 |
| 4,205,529 | 6/1980 | Ko | 62/2 |
| 4,227,375 | 10/1980 | Tompkins | 62/235.1 |

OTHER PUBLICATIONS

The Analysis of an Improved Solar-Powered Cooling System Utilizing Open-Cycle Absorbent Regeneration, by R. K. Collier, Q-11/571, 1978 Annual Meeting of ISES, Aug. 28-31, 1978, Denver, CO.

*Primary Examiner*—Lloyd L. King
*Attorney, Agent, or Firm*—Arnold, White & Durkee

[57] ABSTRACT

A hybrid double absorption air cooling system employing a liquid desiccant solution and capable of operating at low heat source temperature between 55° C. and 80° C. is provided. In one embodiment the system which utilizes low-grade thermal energy, includes an open absorber employing a liquid desiccant solution for absorbing moisture from air passing therethrough, a cooling coil adapted for cooling air passing through the open absorber, and a vapor-absorption refrigeration system which employs the liquid desiccant solution as an evaporable refrigerant and is adapted for cooling and circulating a working fluid, such as water, through the cooling coil and for circulating the desiccant solution through the open absorber. In an alternate embodiment, an open evaporator is adapted for providing cooling water to the open absorber.

25 Claims, 4 Drawing Figures

4,373,347

HYBRID DOUBLE-ABSORPTION COOLING SYSTEM

BACKGROUND OF THE INVENTION

This invention relates to a new and improved method and apparatus for cooling and dehumidifying air and more particularly to a hybrid double absorption system employing a liquid desiccant solution and capable of operating at low heat source temperatures between 55° C. (131° F.) and 80° C. (176° F.).

Much effort has been expended in utilizing solar energy as an energy source for cooling of buildings and other enclosures since the available solar energy and the required cooling are generally in phase. The methods developed to date generally involve one of three cycles: the absorption refrigeration cycle; the rankine/vapor compression cycle and the dehumidification/evaporative cooling cycle using a solid or liquid desiccant. Although a few have become commercially available, none have been able to efficiently employ low grade thermal energy below 80° C. (176° F.). This is particularly unfortunate since flat plate solar collectors become relatively inefficient and expensive when designed for use at or above 60° C. (140° F.).

At least one absorption-refrigeration cycle for solar applications has employed a LiBr-H$_2$O absorption cooling system. However, it is believed that none of the absorption-refrigeration cycles is able to efficiently employ low-grade thermal energy below 80° C. (176° F.).

The Rankine/vapor compression cycle is essentially a solar powered Rankine cycle engine combined with a conventional vapor-compression cooler. This system has the advantage that electricity can be generated if a motor/generator is used to interface the engine with the cooling cycle thereby making the cooling cycle part of a total solar powered system. However, it requires even higher collector temperatures than absorption-refrigeration cycles to achieve good efficiency and more expensive concentrating collectors. Since solar collectors comprise a major portion of the capital investment in a solar cooling system, it is not considered economical to use the Rankine/vapor compression cycle for small residential applications and it is also not applicable to low grade energy resources.

Solid desiccant cooling/dehumidification systems can be powered by low cost flat plate collectors. However, such systems require a large volume of solid desiccant and also entail significant operating costs for the parasitic system of blowers to circulate both the air to be conditioned and the warm air for regeneration. The air must be circulated through large beds of solid granular material, using a considerable amount of blower power. The overall system coefficient of performance of solid desiccant systems is, therefore, considerably less than that of the absorption cooling system. Additionally, the average delivery air enthalpy from a solid desiccant system is generally higher and thus the solid desiccant system has to run longer to satisfy the same load than does the absorption system, thus using even more power, which makes it less attractive for solar applications.

Liquid desiccant systems have also been employed. Generally speaking, as compared to solid desiccant systems, liquid systems require less blower power, produce drier air and have higher system coefficients of performance (C.O.P.). However, such systems have until now been unable to function efficiently with low-grade thermal energy provided at less than 80° C. (176° F.). For example, U.S. Pat. No. 4,205,529 reveals a hybrid air conditioning system that combines a solar powered lithium chloride dehumidifier including a regenerator with a lithium bromide absorption chiller. However, for efficient operation of the system a temperature source of at least 180° F. (82.2° C.) and preferably 200° F. (93.3° C.) is required in the absence of compressors in the absorption chiller.

Table 1 provides an overview of the various methods employed to date using low grade thermal energy:

TABLE 1

| Method | Temperature Level Required | Applications | Estimated C.O.P.* |
|---|---|---|---|
| Rankine/vapor compression | >100° C. | Large scale | 0.8 |
| Absorption LiBr/H$_2$O Single effect | >80° C. | Small or large scale | 0.5–0.8 |
| Double effect | >130° C. | Small or large scale | 0.9–1.5 |
| Absorption NH$_3$/H$_2$O | >120° C. | Small or large scale | 0.4–0.7 |
| Dehumidification Solid desiccant | >60° C. | Small or large scale | 0.3–0.5 |
| Liquid desiccant | >60° C. | Small or large scale | 0.3–0.5 |

*Based on thermal input

As can be readily seen, the lowest temperature level attained 60° C. (140° F.) results in a coefficient of performance of 0.5 at best, while the highest coefficient of performance (0.8) requires a source temperature of at least 80° C. (176° F.).

The prior art devices suffer from other defects as well, including extensive equipment requirements, a need for two working fluids and lack of versatility in meeting changing ambient conditions and system cooling requirements.

SUMMARY OF A PREFERRED EMBODIMENT OF THE INVENTION

The present invention provides a method and apparatus which effectively overcomes the deficiencies noted above. According to the invention a hybrid absorption system utilizing a low grade thermal energy source is provided which includes means for contacting process air with a liquid desiccant solution, first cooling means placed within the contacting means in heat exchange relation with the process air; means for absorbing the heat transferred by the first cooling means, means for mixing water and strong liquid desiccant, second cooling means placed in heat exchange relation with the mixing means; concentrating means utilizing low grade thermal energy to concentrate the desiccant solution from the contacting means and the mixing means, and condensing means for condensing water vapor received from the concentrating means. In a preferred embodiment the contacting means comprises an open absorber and is employed in conjunction with an absorption-refrigeration system such that the system comprises an open absorber using a liquid desiccant solution to absorb moisture from air passing therethrough, a cooling coil as a first cooling means positioned within the open absorber for cooling air passing through the open absorber, an absorber as mixing means for absorbing water vapor into the strong liquid desiccant solution, a generator as concentrating means to concentrate the desiccant solution received from the open absorber and the absorber, a condenser as condensing means for vapor driven off in the generator and an evaporator as means for absorbing the heat transferred from the process air to the cooling coil, said evaporator adapted to vaporize the condensed vapor from the condenser and allow transfer of the resultant vapor to the absorber.

According to the invention, second cooling means may be placed within the contacting means in heat exchange relation with the process air. Thus, in a preferred embodiment an open evaporator with air passing therethrough is adapted for bringing cooling water into heat exchange relation with the process air in the contacting means such as an open absorber. Additionally, third cooling means are preferably provided to remove heat from the mixing means, and condensing means, such as an absorber and a condenser, respectively, of an absorption refrigeration system.

DETAILED DESCRIPTION OF THE PREFERRED EMBODIMENT

Figure 1:
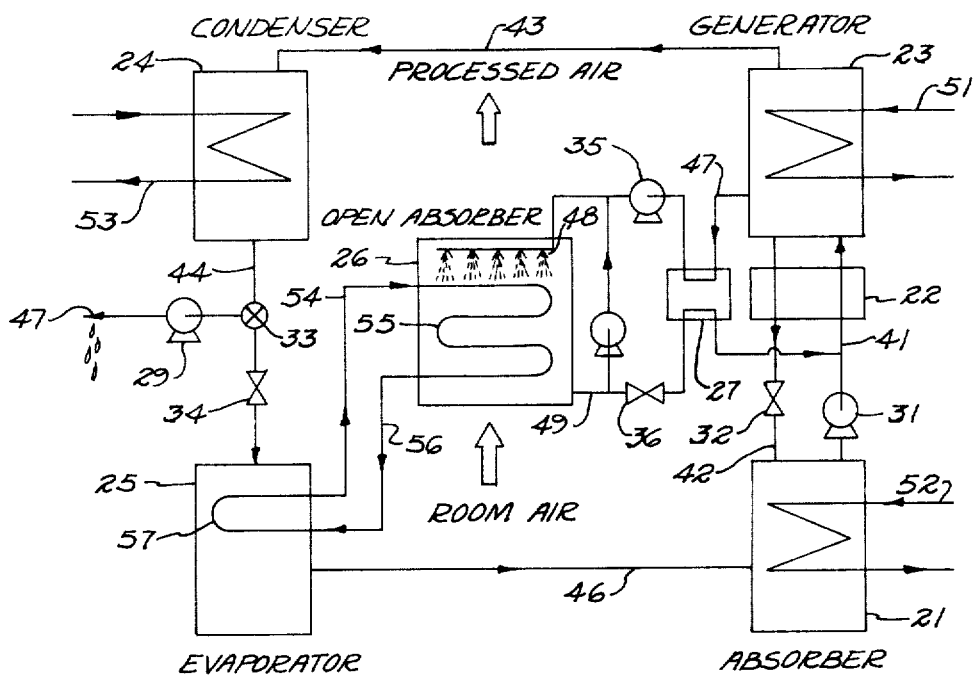
FIG. 1 is a schematic of a hybrid absorption system.

Referring now to FIG. 1, which is a schematic of a hybrid absorption system according to the present invention, water provided by line 46 is absorbed under sub-atmospheric pressure conditions, for example at six (6) millimeters of mercury, by a liquid desiccant, such as lithium chloride, in a mixing means such as absorber 21. As absorption of the water by the liquid desiccant is exothermic and therefore favored by cooler temperatures, the mixing means such as absorber 21 may be linked in heat exchange relation to an external cooling unit such as a water cooling tower (not shown) capable of providing cooling water through line 52. Of course, any one of many heat exchange means or devices well-known to those skilled in the art may be employed in place of the water cooling tower suggested.

The liquid desiccant-water solution formed in absorber 21 is then passed by means of pump 31 from the absorber 21 through line 41 and heat exchanger 22 to concentrating means such as generator 23.

The pump 31 and the expansion valve 32 in return line 42 serve to create and maintain a higher pressure in the generator 23 and its portion of the system as compared to the operating pressure within absorber 21 as will be more apparent from the discussion below.

The concentrating means, generator 23, is supplied with heat from a fluid passing through line 51 which has been previously heated by a low grade heat source (not shown). The operating pressure within the generator 23 is maintained at an intermediate level above the absorber pressure, for example thirty-six (36) millimeters of mercury, such that water from the liquid desiccant-water solution received from absorber 21 is driven off in the form of water vapor and passed to a condensing means such as the condenser 24 through line 43.

Utilizing a lithium chloride desiccant, the generator 23 may be operated at a temperature of about 60° C. (140° F.) such that the heat of regeneration of the liquid desiccant may be supplied from any available low grade heat source such as solar collectors or plates, low grade geothermal energy or available waste heat. By way of example, the fluid passing within line 51 could be communicated to a solar panel or otherwise connected to a solar heating system (not shown) such that warm fluid, such as water, is supplied at about 60° C. (140° F.).

The liquid desiccant solution remaining in generator 23 is now at a higher temperature and concentrated as a result of the water vapor being driven off and is either returned to the absorber 21 through line 42 and expansion valve 32 or is passed through line 47 by pump 35 to the open absorber 26. Whether the concentrated solution is passed to absorber 21 or open absorber 26 is dependent upon the specific characteristics of the air to be cooled by the system. Heat exchangers 22 and 27 allow heat transfer from the warm, concentrated liquid desiccant solution leaving the generator 23 to the diluted liquid desiccant solutions coming from the absorber 21 through line 41 and from the open absorber 26 through line 49, respectively. The strong or concentrated desiccant solution in lines 42, 47 is thus cooled, facilitating the maintenance of a lower temperature which is desired in the open absorber 26 and the absorber 21.

Water vapor, which passes from the generator 23 through the line 43, is condensed to liquid in the condenser 24, under intermediate pressure, by cooling the vapor. This cooling may be accomplished by the use of another cooling fluid in line 53 which is connected, for example, to a cooling tower (not shown). As with the absorber 21, any one of many heat exchange means or devices well-known to those skilled in the art may be employed to cool the fluid in line 53. The condenser 24 may operate at approximately the same intermediate pressure as the generator 23. The water condensed within condenser 24 then passes through line 44 and expansion valve 34 to a means for absorbing heat such as the evaporator 25. The evaporator 25, along with the absorber 21, are maintained at a lower pressure, for example six (6) millimeters of mercury, by expansion valves 32 and 34. Therefore, the condensed water from condenser 24 flashes into vapor within evaporator 25, while contacting coils 57. Flowing within coils 57 is a working fluid such as water which transfers the heat it has previously absorbed from the process air in the open absorber 26 as shall hereinafter be more fully described. Thereafter, the water vapor within evaporator 25 passes back to the absorber 21 via line 46 and the cycle may be repeated.

The concentrated liquid desiccant solution passing from generator 23 through line 47 is brought into direct contact with the air to be processed in a contacting means such as the open absorber 26 through means of dispersion nozzles 48 as seen in FIG. 1. The desiccant solution dehumidifies the process air as they come into contact with one another. After contacting the process air in the open absorber 26 and absorbing water vapor from the air, the now weakened or diluted solution of liquid desiccant may be passed back to the generator 23 through means of lines 49 and 41. As already mentioned, during its passage through line 49, the less concentrated desiccant solution is heated in heat exchanger 27 by the flow of the concentrated solution passing through line 47.

The process air passing through the open absorber 26 is also cooled by a working fluid, such as water, which passes through line 54, removes heat from the process air through means of coils 55 and then returns to the evaporator 25 through line 56 where it transfers its heat load to the water passing from line 44 as the water flashes into vapor in the evaporator 25, as heretofore described.

In order to absorb the excess humidity in the processed air, as already noted, a portion of the concentrated liquid desiccant solution formed within the generator 23 may be passed through heat exchanger 27 by line 47. Pump 35 then increases the pressure of the concentrated solution to atmospheric pressure and communicates it to the open absorber 26. Thereafter, it is sprayed through nozzles 48 onto cooling coils 55 located in the open absorber 26. The open absorber 26 may take a number of forms known to those skilled in the art. However, the preferred embodiment employs a falling film finned-tube exchanger consisting of an ordinary finned-tube heat exchanger with a falling film distributor at the upper end of the finned-tube arrangement. The chilled working fluid, such as water, which circulates through the coils 55, passes from the evaporator 25 by means of line 54 into the tubes within the finned-tube exchanger while the process air passes over the flow passages on the finned side thereof with the liquid desiccant solution dripping down the finned-tube surfaces as a falling film. According to the present invention this configuration is preferred in order to make use of the inherent high heat and mass transfer characteristics of a thin falling film and to have a compact absorber size as both sensible and latent loads are processed in the same absorber. In addition, air passing over the falling film on the surface of the fins has much less pressure drop than in passing through the more commonly used contacting means such as a packed tower or bubble tray column.

Because of the possibility of absorbing excess water from the processed air into the liquid desiccant solution in the open absorber 26, a bleed valve 33 may be installed between the condenser 24 and the expansion valve 34 in order to properly regulate the water content in the desiccant system. Additionally, since the working pressure on the generator-condenser portion of the system is at an intermediate level which is subatmospheric, a pump 29 may be needed to raise the pressure of the excess water to approximately one atmosphere before it can be bled off.

The selection of the liquid desiccant solution for the system is influenced by several criteria. More particularly, it is preferable that the absorbent solution possess the following characteristics:

1. It should be nontoxic, nonflammable, noncorrosive, odorless and chemically stable.
2. It should have suitable vapor pressure characteristics for absorption and regeneration. Additionally, the operating range should be at least five degrees centigrade above the crystalization limit for the solution.
3. It should possess good heat transfer characteristics and low viscosity.
4. It should be widely available and relatively inexpensive.
5. It should be compatible with a wide range of component structure materials.

Although a lithium chloride-water solution is employed as the working fluid of the disclosed system since it satisfies most of these requirements, a number of other desiccants may be beneficially employed in solution, including triethylene glycol and calcium chloride.

The subject hybrid absorption system appears to function well with evaporator temperatures of 12.8° C. (55° F.) or lower as opposed to 5° C. (41° F.) or lower for a typical absorption-refrigeration system. This is due in large part to the need to overcool the process air in a typical absorption refrigeration system in order to sufficiently dry the air.

Based on an evaporator temperature of 12.8° C. (55° F.) and for latent load ratios of up to 40%, the coefficient of performance of the hybrid absorption system is believed to be essentially a function of generator temperature and cooling water or air temperature. Cooling water or air temperatures are preferably at or below 32.3° C. (90° F.), such that the system may operate efficiently with a low grade heat source ranging from 60° C. (140° F.) to 80° C. (176° F.), particularly when the latent load is small. As cooling water or air temperatures below 32.3° C. (90° F.) are usually available for typical summer operations, it is readily appreciated from the immediately foregoing discussion that the hybrid absorption system can efficiently function when used with a low grade heat source where latent loads do not exceed 40%. The following table further illustrates some approximate performance parameters of the present hybrid absorption system calculated on the basis of an evaporator temperature of 12.8° C. (55° F.).

TABLE 2

| Cooling water temperature (°C.) | Latent Load | Generator Temperature (°C.) | Coefficient or Performance |
| --- | --- | --- | --- |
| 26.7 | 10% | 53 | .75 |
| 29.5 | 10% | 60 | .70 |
| 32.2 | 10% | 65 | .70 |
| 26.7 | 20% | 53 | .65 |
| 32.2 | 20% | 65 | .61 |
| 26.7 | 30% | 53 | .58 |
| 32.2 | 40% | 60 | .45 |
| 26.7 | 40% | 53 | .50 |

Figure 3:
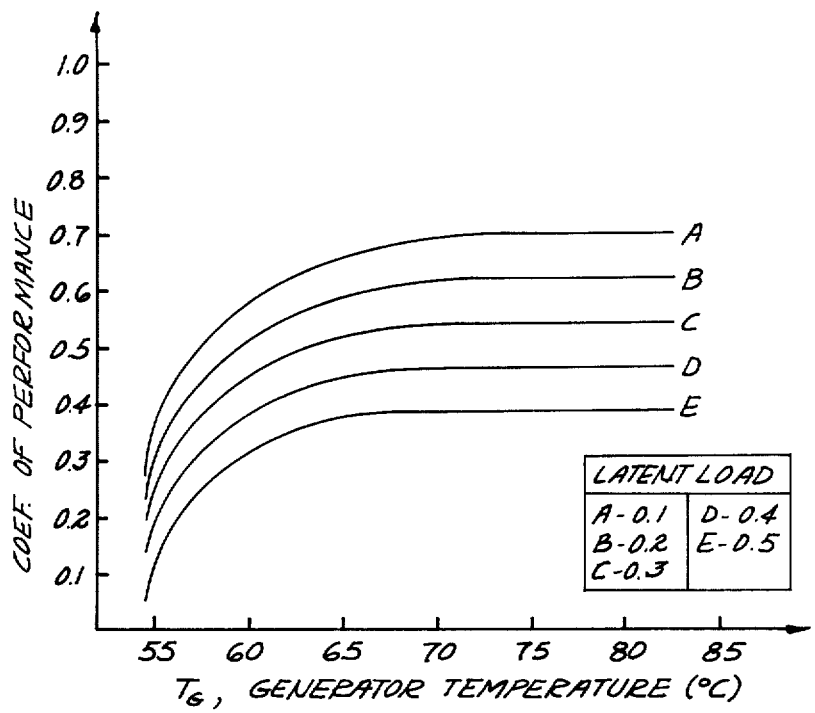
FIG. 3 is a graphical representation of the calculated coefficient of performance of a hybrid absorption system for a given constant latent load and generator temperature.

Possible operating ranges for the present system are further illustrated by the curves shown in FIG. 3 which are calculated on the basis of a constant evaporator temperature of 12.8° C. (55° F.) and a cooling water temperature of 32.2° C. (90° F.). From this illustration and the foregoing discussion, it is apparent that the present hybrid absorption system may be efficiently operated under these conditions using a low grade thermal energy source for latent load ratios of up to 40%. This compares quite favorably with prior art devices as evidenced by Table 1.

If latent loads exceed 40–50%, it is preferable to employ a hybrid absorption evaporation system to avoid using the working fluid in line 56 which flows from the evaporator 25 to the open absorber 26 to absorb excess amounts of the latent heat of absorption. This may be accomplished by placing a second cooling means in heat exchange relation with the process air to remove latent heat. For example, cooling water, such as from an open evaporator, may be provided to absorb a portion of the latent heat of absorption released in the open absorber 26.

Figure 2:
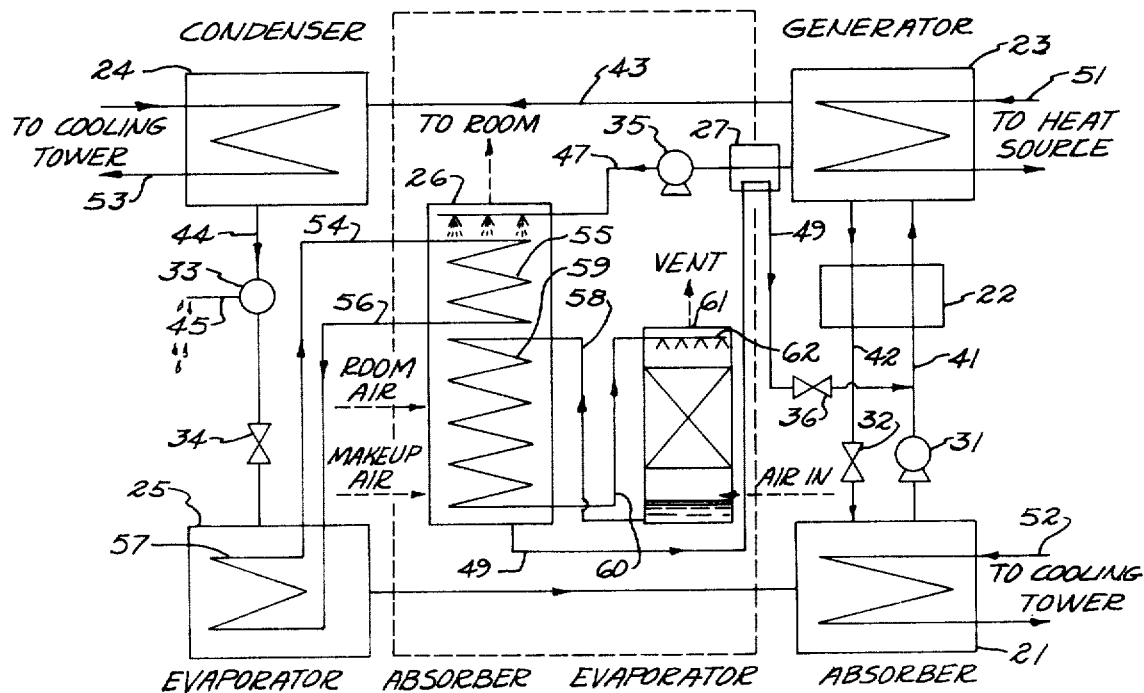
FIG. 2 is a schematic of a hybrid absorption evaporation system.

Referring now to FIG. 2, a modification of the preferred embodiment is shown and which may be referred to as a hybrid absorption evaporation system. The system essentially operates as before with the addition of an open evaporator 61 placed in heat exchange relation with the open absorber 26 through means of lines 58 and 60 and coils 59 located directly in the path of the processed air. The open evaporator 61 cools a second working fluid, such as water, by dispersing the fluid through nozzles 62 into an open air environment and then the cooled water is channeled through line 58 to coils 59 located in the open absorber 26 in order to provide added cooling for the process air. In accordance with the present invention, the cooling water passing through lines 58 and coils 59 absorbs part of the latent heat of absorption released in the open absorber 26. As this reduces the load required to be processed by the evaporator 25 through coils 57, the system is provided with increased versatility, since it is able to meet a wider range of changes in the latent load due to increased humidity of the process air by selectively employing the open evaporator 61.

The air that is drawn into the open evaporator 61 may be either ambient air or the return room air depending upon process needs. Additionally, unlike prior art devices employing solar energy, a portion of the dry and cool air from the open absorber 26 may be employed to produce chilled water in the open evaporator 61. Such a recycle loop serves to increase the overall efficiency of the system and allows the use of warmer water in the open evaporator 61. If processed cool and dry air is to be employed to cool the water used in evaporator 61, a suitable return duct could be attached between the outflow from the open absorber 26 and the intake section of the open evaporator 61.

Figure 4:
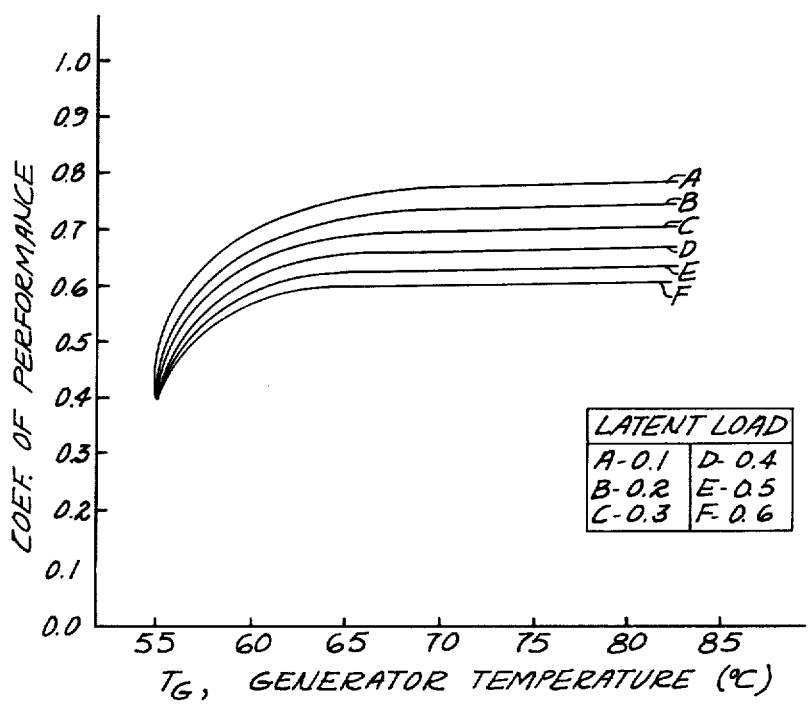
FIG. 4 is a graphical representation of the calculated coefficient of performance of a hybrid absorption evaporation system for a given constant latent load and generator temperature.

The efficiency of the hybrid absorption evaporation system of FIG. 2 exceeds that of the hybrid absorption system of FIG. 1, particularly where the latent load exceeds 40%. The nature of this improvement is illustrated in FIG. 4, which is a graphic representation of the calculated performance of the hybrid absorption evaporation system of FIG. 2 based on a constant evaporator temperature of 12.8° C. (55° F.), a cooling water temperature of 32.2° C. (90° F.), and a coefficient of performance of 0.5 for the open absorber and open evaporator in the desiccant dehumidification mode.

The hybrid evaporation system appears to be not only more efficient than prior art devices employing low grade thermal energy, but also more versatile. The system is very capable of meeting varying latent loads and process conditions as initially configured and also functionally adaptable. In this regard several modes of operation are possible with the same system such that it may perform as a hybrid absorption system, a conventional absorption refrigeration system, a dehumidification system or an open regeneration system. This may generally be accomplished through the use of properly placed valves and vents, as shall presently be described.

One mode of operation essentially does not utilize the open portions of the system such that the entire apparatus operates as a closed absorption-refrigeration system. By way of example, line 47 could be closed to prevent flow between the heat exchanger 27 and the generator 23, while line 49 could be closed just prior to its junction with line 41 through use of valve 36. This first mode is particularly appropriate when the latent load is negligible or nonexistent, as in cases of very low humidity. Cooling occurs by heat transfer directly from the process dry air to the cooled working fluid in coils 55. The working fluid in turn transfers this sensible heat load to the evaporating water in the evaporator 25 which operates efficiently at temperatures of 12.8° C. (55° F.) or higher when the latent load is quite small.

In a second mode of operation, the appropriate valves may be adjusted such that the system operates in the same fashion as described for the embodiment shown in FIG. 1. By way of example, either line 58 or line 60 or both may be equipped with valve(s) such that the flow of cooling water from the open evaporator 61 to the open absorber 26 may be prevented. This mode of operation is especially appropriate when the ratio of the latent heat load to the sensible heat load is below 40%.

A third mode of operation may be employed in which the system functions as a dehumidification system. Thus, all of the strong or concentrated desiccant solution may be communicated directly to the open absorber 26 via line 47 rather than being returned by line 42 to absorber 21. In this mode, all of the condensed water vapor could be removed from the system by line 45.

In a variation of the foregoing mode the system could essentially be operatively reduced to the generator 23 and the open portions of the system—i.e. the open absorber 26 and open evaporator 61. Pursuant to this variation a portion of the cool and dry air leaving the open absorber 26 would be circulated through the open evaporator 61. Line 41 would be closed off between pump 31 and the junction of lines 49 and 41. This could be accomplished by placing a three-way valve at the juncture of lines 41 and 49 with flow open from line 49 into the generator 23. Additionally, line 43 would be closed and coils 55 left nonoperational. As before, weak desiccant solution arriving at the generator through line 41 via line 49 would be regenerated or concentrated by a low grade energy source. The concentrated desiccant solution would then circulate through the open absorber 26 via lines 47 and 49. Cooled water or other working fluid from the open evaporator 61 could be recycled through lines 58 and 60 as well as coils 59 in order to reduce the temperature of the process air. Additionally, if the immediately foregoing system was built independently of the remainder of the system, a stripper with a fin-tube arrangement similar to that in the open absorber could be employed.

In still another mode in accordance with the invention the system may provide for the open regeneration of the weak desiccant solution. Thus, the closed generator 23 can be converted into an open regenerator through use of a properly placed vent, such that the solvent, such as water, is evaporated directly into the atmosphere. Additionally, the condenser could be "removed" from the system by use of appropriate valves located on lines 43 and 44 and make-up water fed to the evaporator 25 and flashed directly into vapor. In such a configuration only two pressure levels would exist—the evaporator pressure and atmospheric pressure.

The advantage of using a hybrid absorption type system could be more pronounced by operation of the system in this open regeneration mode, since the regenerative capacity is directly proportional to the difference in water vapor pressure between the absorbent solution and the outside air. The higher evaporator temperature in the hybrid system gives higher vapor pressure for the absorbent solution to be regenerated and, therefore, requires less surface area for regeneration.

A number of other variations to the embodiments discussed herein may also be employed within the spirit and framework of the invention. For example, the generator 23 may be replaced by a concentrator directly exposed to the sun's rays. However, depending upon ambient conditions and process air requirements, it is generally preferable to employ the system as a hybrid absorption system or a hybrid evaporation absorption system.

Additional items of equipment may be employed within the framework of the present invention. For example, control of the system as well as system versatility may be enhanced through the use of appropriate process controls, including temperature and humidity controls as well as pneumatic control valves, though the use of essentially manual control devices may suffice for many operations. Additionally, appropriate filtering devices may be employed to filter out foreign materials entering into the system through the open units such as the open absorber 26 or open evaporator 61. Similarly, a vacuum pump may also be employed in case excessive amounts of absorbed or entrained air enter the system through the open units.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the size, shape and arrangement of parts. For example, equivalent elements or materials may be substituted for those illustrated and described herein, parts may be reversed, and certain features of the invention may be utilized independently of the use of other features. All this would be apparent to one skilled in the art after having the benefit of this description of the invention.

What is claimed is:

1. A hybrid double-absorption air cooling system utilizing low grade thermal energy comprising:
   an open absorber employing a liquid desiccant solution for absorbing water vapor from air passing therethrough;
   a cooling coil associated with said open absorber for cooling air passing through said open absorber; and
   a vapor-absorption refrigeration system which uses the water vapor content of said liquid desiccant solution as an evaporable refrigerant and having means for cooling and circulating a first working fluid through said cooling coil and means for circulating said desiccant solution through said open absorber, said refrigeration system including:
      a condenser for condensation of the heated water vapor evaporated from said desiccant solution to form condensed liquid water,
      an evaporator in fluid communication with said condenser for evaporating said condensed water and for cooling said first working fluid,
      an absorber connected to said evaporator for absorbing into the desiccant solution the vaporized water from said evaporator; and
      a generator for receiving the absorbed solution from the absorber and generating the heated vapor of said desiccant solution for circulation to said condenser, said generator being in fluid communication with the open absorber for circulating a portion of said liquid desiccant through said open absorber.

2. The hybrid double-absorption air cooling system of claim 1 further including an open evaporator for cooling a second working fluid and means for circulating said second fluid through said open absorber.

3. The system of claim 1 further comprising:
   (a) a second cooling coil associated with the condenser for removing heat from the condenser; and
   (b) a third cooling coil associated with the absorber for removing heat from the absorber.

4. The system of claim 3 wherein the working fluid of the second and third cooling coil is water at or below a temperature of about 32.2° C. (90° F.) prior to entering the second and third cooling coils.

5. The system of claims 1 or 2 wherein the evaporator is operated at a temperature greater than 5° C.

6. The system of claims 1 or 2 wherein the generator is operatively connected to a heat source having a temperature of 80° C. or less.

7. The system of claims 1 or 2 further comprising:
   (a) a means for venting the generator to the atmosphere;
   (b) a valve for selectively preventing fluid communication between the generator and the condenser; and
   (c) means for providing water directly to the absorber.

8. A hybrid double-absorption air cooling system utilizing low grade thermal energy comprising:
   (a) an absorber;
   (b) a generator;
   (c) first and second conduits connecting the absorber and the generator;
   (d) a first heat exchanger adapted to place a first fluid flowing through the first conduit in heat exchange relationship with a second fluid flowing through the second conduit;
   (e) a condenser;
   (f) a third conduit connecting the generator and the condenser;
   (g) an evaporator;
   (h) a fourth conduit connecting the condenser and the evaporator;
   (i) a fifth conduit connecting the evaporator and the absorber;
   (j) an open absorber;
   (k) a sixth conduit connecting the generator with the open absorber;
   (l) a seventh conduit attached between the open absorber and the first conduit at a point between the absorber and the first heat exchanger;
   (m) a first pump located on the first conduit between the absorber and the junction of the first and seventh conduits;
   (n) a first expansion valve located in the second conduit between the first heat exchanger and the absorber;
   (o) a second heat exchanger adapted to place fluids flowing through the sixth and seventh conduits in heat exchange relationship;
   (p) a second expansion valve located in the seventh conduit between the junction of the first and seventh conduits and the second heat exchanger;
   (g) a second pump located in the sixth conduit between the open absorber and the heat exchanger;
   (r) a bleed valve located in the fourth conduit;
   (s) a third expansion valve located in the fourth conduit between the bleed valve and the evaporator;

(t) a first cooling coil circuit adapted for circulating a working fluid between the open absorber and the evaporator;

(u) a second cooling coil adapted to circulate cooling water through the condenser;

(v) a third cooling coil adapted to circulate cooling water through the absorber; and (w) a heating coil adapted to circulate water heated by a low grade heat source through the generator.

9. The system of claim 8 further comprising:
   (a) an open evaporator; and
   (b) a cooling coil associated with said open absorber and adapted to circulate water cooled in the open evaporation to the open absorber.

10. The system of claim 1, wherein the open absorber includes a falling-film finned-tube exchanger comprising a finned-tubed heat exchanger and a falling film distributor mounted on the upper portion of the finned-tube heat exchanger.

11. A method of cooling a process air stream by utilizing low grade thermal energy comprising the steps of:
   (a) contacting a liquid desiccant with water to form a desiccant solution;
   (b) concentrating the desiccant solution by placing it in heat exchange relation at subatmospheric pressure with a low grade energy source so as to vaporize at least a portion of the water from the desiccant solution;
   (c) collecting and condensing the vaporized water;
   (d) revaporizing the condensed water while placing it in heat exchange relationship with a first working fluid;
   (e) diluting at least a portion of the concentrated desiccant solution by bringing it in contact with the process air stream so as to remove water from the process air stream;
   (f) placing the process air stream in heat exchange relation with the first working fluid; and
   (g) contacting the desiccant solution with the revaporized water.

12. The method of claim 11 further comprising the steps of cooling a second working fluid by passing said second working fluid through a second air stream and placing the second working fluid in heat exchange relation with the process air stream.

13. The method of claim 12 wherein a portion of the process air stream serves as the source for at least a portion of the second air stream after the process air stream is contacted by the concentrated desiccant solution and placed in heat exchange relation with the first working fluid.

14. The method of claim 11 wherein the step of diluting at least a portion of the concentrated desiccant solution by bringing it in contact with the process air stream occurs concurrently with the step of placing the process air stream in heat exchange relation with the first working fluid.

15. The method of claim 11, wherein the low grade energy source is at a temperature between 50° C. (122° F.) and 80° C. (176° F.).

16. The process of claim 11 wherein the step of revaporizing the water by placing it in heat exchange relation with the first working fluid occurs at a temperature greater than 5° C. (41° F.).

17. The process of claim 11 wherein the concentrated desiccant solution is formed into a thin film and contacted with the process air.

18. A method of cooling a process air stream by utilizing low grade thermal energy comprising the steps of:
   (a) contacting a desiccant with water in an absorber to form a weak desiccant solution;
   (b) pumping the weak desiccant solution from the absorber to a generator;
   (c) mixing the weak desiccant solution with more weak desiccant solution returning from an open absorber prior to passing the mixture to a generator;
   (d) concentrating the weak desiccant solution in the generator by heating the solution by means of a low grade thermal energy source whereby water is vaporized from the desiccant;
   (e) transferring the water vapor from the generator to a condenser;
   (f) condensing the water vapor in the condenser by cooling the vapor by using a first stream of cooling water;
   (g) pressurizing and condensed water to approximately one atmosphere;
   (h) cooling the condensed water through expansion and passing said condensed water to an evaporator;
   (i) pressurizing at least a portion of the strong desiccant solution from the generator to approximately one atmosphere and then communicating it to the open absorber;
   (j) bringing the strong desiccant solution into direct contact with the process air stream in the open absorber by dispensing it in the form of a fine film, whereby the strong solution is weakened by the absorption of water from the air;
   (k) circulating water between the open absorber and the evaporator such that it absorbs heat from the process air stream in the open absorber and revaporizes the condensed water in the evaporator; and
   (l) transferring the revaporized water from the evaporator to the absorber.

19. The process of claim 18 further comprising the steps of:
   (a) passing a second air stream through an open evaporator;
   (b) dispersing water through the second air stream in the open evaporator whereby the water is cooled;
   (c) placing the cooled water from the open evaporator in heat exchange relationship with the process air stream by passing the cooled water through coils positioned in the open absorber; and
   (d) recirculating the water from the open absorber to the open evaporator.

20. The process of claims 18 or 19 wherein the low grade heat source is at a temperature between 50° C. (122° F.) to 80° C. (176° F.).

21. The process of claims 18 or 19 wherein the cooling water entering the absorber and the condenser is at or below 32.3° C. (90° F.).

22. A hybrid absorption system utilizing low grade thermal energy to cool process air comprising:
   an open absorber for contacting the process air with a liquid desiccant solution and having one end of a cooling coil in heat exchange relation with the process air;
   a generator in heat exchange relation with a low grade thermal energy source and having first and second conduits placing the generator in fluid communication with the open absorber for circulating the liquid desiccant solution between the generator and the open absorber;

a condenser in fluid communication with the generator;

an evaporator in fluid communication with the condenser and having the other end of the cooling coil in heat exchange relation with the evaporator; and an absorber in fluid communication with the evaporator and the generator.

23. The apparatus of claim 22 further comprising cooling means placed in heat exchange relation with the process air.

24. The apparatus of claim 23 wherein the cooling means comprises:

a second colling coil a portion of which is in heat exchange relation with the open absorber; and an open evaporator in fluid communication with the second cooling coil.

25. The apparatus of claim 24 wherein the open evaporator is in fluid communication with the open absorber so as to receive process air from the open absorber.

* * * * *